United States Patent [19]

Peterson et al.

[11] Patent Number: 5,540,290
[45] Date of Patent: Jul. 30, 1996

[54] TOOLBAR FOLDING WING LOCK

[75] Inventors: Richard L. Peterson, LeSueur; Roger J. Scheurer, Kasota, both of Minn.

[73] Assignee: Hiniker Company, Mankato, Minn.

[21] Appl. No.: 421,803

[22] Filed: Apr. 13, 1995

[51] Int. Cl.$^6$ .................................................. A01B 63/14
[52] U.S. Cl. ........................................ 172/311; 172/456
[58] Field of Search .................................. 172/311, 456, 172/458, 459, 662; 403/321

[56] References Cited

U.S. PATENT DOCUMENTS

| | | | |
|---|---|---|---|
| 3,692,121 | 9/1972 | Kenney | 172/456 |
| 3,814,191 | 6/1974 | Tilbury | 172/311 |
| 4,023,623 | 5/1977 | Anderson | 172/311 |
| 4,116,282 | 9/1978 | Hansen | 172/311 |
| 4,316,511 | 2/1982 | Andersen | 172/456 |
| 4,415,043 | 11/1983 | Hadler et al. | 172/662 |
| 4,561,505 | 12/1985 | Williamson | 172/311 |
| 4,878,545 | 11/1989 | Dyken | 172/311 |
| 5,213,165 | 5/1993 | Dunn et al. | 172/311 |

OTHER PUBLICATIONS

BLU–JET Brochure RA LW–689 20M.
Hiniker Series I and II Econ–O–Till Cultivator Drawing No. 198.
Hiniker Series 5000 Row Cultivator Drawing No. 1688.
Hiniker Series I and II Econ–O–Till Cultivator Drawing No. 199.

*Primary Examiner*—Spencer K. Warnick, IV
*Attorney, Agent, or Firm*—Reising, Ethington, Barnard and Perry

[57] ABSTRACT

The toolbar (10) includes a center section (12), a first wing (14) and a second wing (16). The first wing (14) is pivotally attached to the center section (12) by a first wing pivot pin (132). A double acting hydraulic cylinder (154) for pivoting the first wing (14) relative to the center section (12) is pivotally attached to the center section and to a lift link (146) which is also attached to the first wing by a pin (148). The lift link (146) increases the range of movement of the first wing (14) relative to first wing pivot axis (138). A lift link lock latch bar (198) is pivoted about the axis of pendulum shaft (188) by a pendulum weight (194) and moved into a position in which movement of the lift link (146) relative to the first wing 14 is blocked. Retraction of the cylinder 154 moves the first wing (14) toward a transport position and the pendulum weight 194 pivots the lift link lock latch bar (198) away from the lift link (146) thereby freeing the first wing (14) to pivot to its transport position. The second wing (16) is attached to the center section (12) and folded in the same way as the first wing (14).

3 Claims, 4 Drawing Sheets

TOOLBAR FOLDING WING LOCK

TECHNICAL FIELD

This invention relates to a toolbar with a center section and folding wings and more particularly to a lock for locking folding wings in a common plane with the center section.

BACKGROUND OF THE INVENTION

Toolbars are used for connecting soil working tools to a tractor. The soil working tools mounted on tool bars are employed for planting and tilling crops such as corn and soybeans that are planted in spaced apart rows. Individual soil working gangs or units and planter units are clamped to the tool bar. The spacing between the gangs or units can be changed by loosening the mounting clamps, sliding the gangs or units along the toolbar to the desired position and then retightening the mounting clamps.

Planter units mounted on toolbars are attached to the tool bar by parallel links that allow the planter unit to float up and down relative to the toolbar. The planter units float up and down to insure that the openers open a slit to the proper depth and that seeds deposited in the slit are covered with the desired amount of soil. Seed placement and seed depth are very important factors affecting seed germination and crop yield.

Crops such as corn are commonly planed with planter units on large toolbars which plant 16 to 24 or even more crop rows on each pass through the field. A toolbar that plants 24 rows with 30 inch spacing between the rows plants a 60' strip on each pass. The amount of up and down float provided for planter units relative to the toolbar they are mounted upon is limited. To maintain uniform seed placement depth with large planters, it has been necessary to employ tool bars with hinged joints and floating wings when planting all but the flattest fields. With the hinge axis of large toolbars having planter units, located thirty to forty eight inches or more above the surface of a field, a slight change in the angle between two sections of the toolbar will make a substantial change in the space between the rows planted by planter units adjacent to the hinged joint. To cultivate between plant rows planted with a planter having a toolbar with floating wings, the row crop cultivator used to do the cultivating must have a toolbar with floating wings and wings with pivots in the same locations as the planter toolbar to accommodate the changes in row spacing. Row crop cultivator gangs would likely kill growing plants planted with planter units on a toolbar with floating wings if the row crop cultivator gangs are not mounted on a tool bar with floating wings. On the other hand crops planted in rows by planter units mounted on a rigid toolbar should be cultivated with cultivator gangs mounted on a rigid toolbar.

Toolbars with folding and floating wings have been provided with hardware for fastening the wings rigidly to a center section. The hardware generally includes threaded fasteners that clamp the wing to the center section and prevent pivotal movement about the axis of the pivotal connection between the wing and the center section. The operator must stop the tractor and use hand tools to change between a rigid wing and center section and a floating wing and center section.

Cultivator gangs and shanks that are cultivating soil which is compact and hard because it has not been cultivated for several months or has been compacted by machinery may require additional weight from the toolbar to hold the earth engaging tools at the desired working depth. Soil engaging tools on a floating wing may pivot the wing up and reduce soil penetration. While cultivating in such conditions, it is necessary to rigidly secure toolbar wings to the center section.

There are numerous obstructions in and around farm fields which may interfere with toolbars and the tools mounted on the toolbars. These obstructions include things like rocks, water drainage ditches, utility poles, roads, buildings, trees and irrigation structures. It can be very helpful to be able to fold a wing up to clear an obstruction. If you have an irrigation ditch or a road at each end of a field the tractor operator may need to fold the toolbar wings at each end of the field to turn around and make a pass across the field in the opposite direction. With some gangs or units, the overall width of a machine can be decreased substantially by folding the wings 180° or close to 180°. When the toolbar wings are folded 180°, the earthworking tools clamped to the wings extend upwardly rather than out to the side.

SUMMARY OF THE INVENTION

An object of the invention is to provide a lock that locks a toolbar wing section relative to a toolbar center section.

Another object of the invention is to provide a lock that locks a toolbar wing section to a toolbar center section automatically in response to folding the wing to a working position.

A further object of the invention is to provide a lock that automatically unlocks a wing section during pivotal movement of the wing section toward a transport position.

A still further object of the invention is to provide a gravity activated toolbar folding wing section lock.

The toolbar of this invention includes a center section and a wing section pivotally attached to each end of the center section. The center section has attaching brackets for attaching the toolbar to the three point draft links of a tractor or to some other hitch assembly. The center section includes a rectangular tube that extends horizontally in a direction transverse to the direction of movement of the tractor. A toolbar wing section is pivotally attached to each end of the center section for pivotal movement about a wing pivot axis. A lift link is pivotally attached to each wing section at a pivot point spaced from the wing pivot axis. A hydraulic cylinder is connected to each lift link and to the center section of the toolbar. The hydraulic cylinders can fold the wings between positions extending generally horizontally outward from the ends of the center section and positions above the center section of the toolbar.

A lift link lock latch bar is attached to a latch bar pivot shaft that is journaled on each wing section of the tool bar. A pendulum weight is secured to each latch bar pivot shaft. When a wing section is in its generally horizontal working position extending horizontally outward from the center section, the weight secured to the latch bar pivot shaft pivots the latch bar pivot shaft to a position in which the lift link lock latch bar blocks pivotal movement between the lift link and the wing section. Closing a valve to lock the hydraulic cylinder piston in a fixed position will then lock the wing section in a fixed position. Lifting the wing section with the hydraulic cylinder rotates the lift link lock latch bar, releases the lift link and allows the wing section to move into a transport position. The other wing operates the same way.

The foregoing and other objects, features and advantages of the present invention will become apparent in the light of the following detailed description of an exemplary embodiment thereof, as illustrated in the accompanying drawing.

DETAILED DESCRIPTION OF THE DRAWINGS

Figure 1:
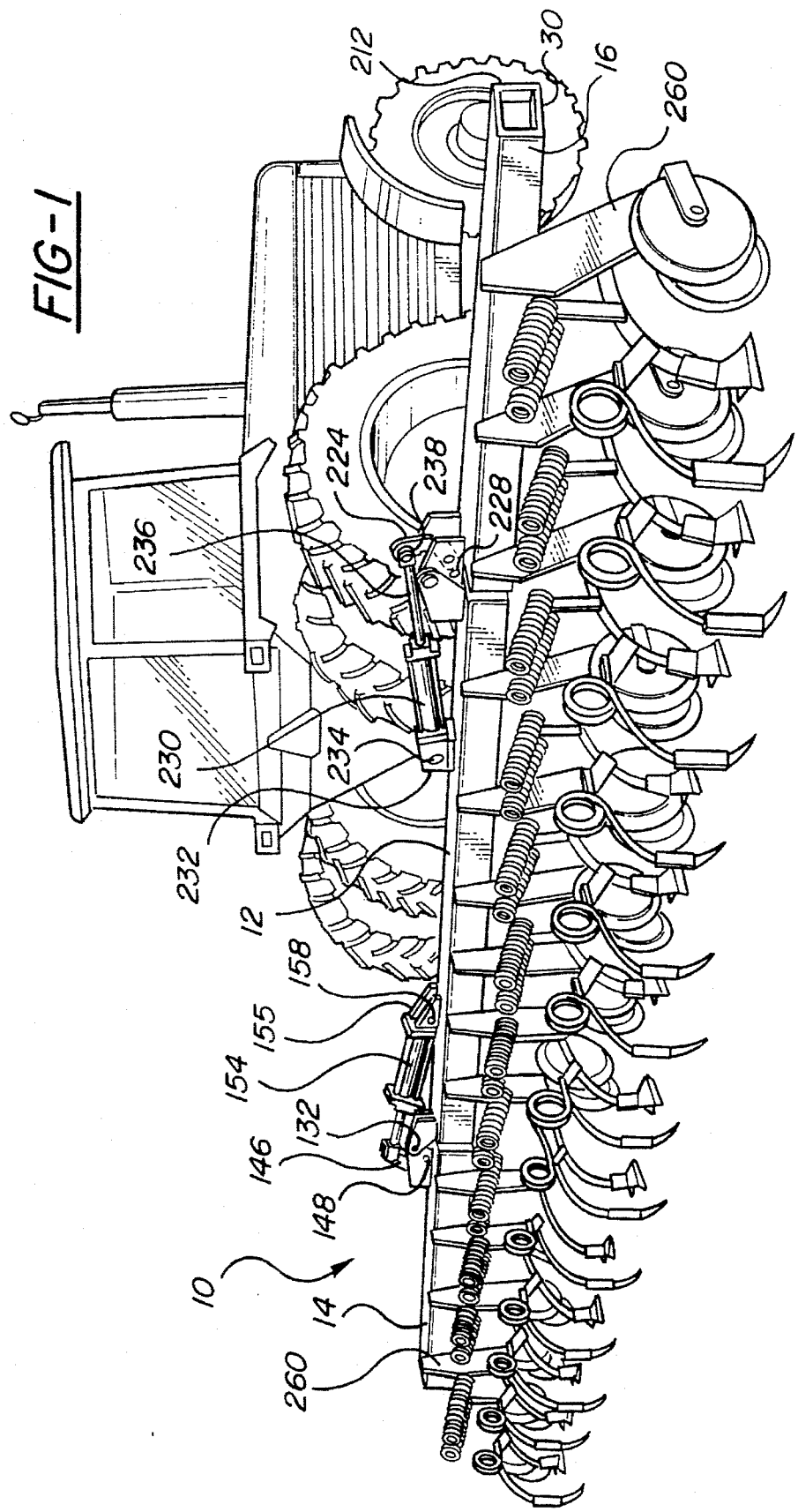
FIG. 1 is a perspective view of a toolbar, with two wing sections attached to a center section, mounted on a tractor and a plurality of earth working gangs shown schematically.

In the following description left and right refers to the left hand side and the right hand side, as seen by a person standing to the rear of the toolbar 10 and facing in the normal direction of forward movement.

The toolbar 10 includes a center section 12, a first wing 14 and a second wing 16. The center section 12 includes an elongated rectangular tube 18, two lower draft link attaching assemblies 20 and 22 and an upper draft link attaching assembly 24. The lower draft link attaching assembly 20 includes a left side plate 26 and a right side plate 28 welded to the bottom wall 30 of the rectangular tube 18. A reinforcing plate 32 is welded to the two side plates 26 and 28 and to the bottom wall 30. A pair of lower apertures 34 and 36 and a pair of upper apertures 38 and 40 are provided in the two side plates 26 and 28. A pin 42 is received in one of the pairs of apertures 34 and 36 or 38 and 40 and retained by a spring pin 44 and a link pin 46.

The lower draft link attaching assembly 22 includes a left side plate 48 and a right side plate 50 welded to the bottom wall 30 of the rectangular tube 18. A reinforcing plate 52 is welded to the two side plates 48 and 50 and to the bottom wall 30. A pair of lower apertures 54 and 56 and a pair of upper apertures 58 and 60 are provided in the two side plates 48 and 50. A pin 62 is received in one of the pairs of apertures 54 and 56 or 58 and 60 and retained by a spring pin 64 and a link pin 66.

The upper draft link attaching assembly 24 includes two parallel vertical spaced apart plates 68 and 70 welded to the front wall 72 of the rectangular tube 18. The two plates 68 and 70 have three sets of aligned apertures 74, 76 and 78 for an upper draft link pin 80 that is retained in one of the sets of aligned apertures by a link pin 82.

A first wing attaching inner pivot assembly 84 is rigidly secured to the left end of the rectangular tube 18. The inner pivot assembly 84 includes a front plate 86 and a rear plate 88 and reinforcing plates 90 and 92 welded to the front and rear plates. Tubular member 94 is welded into an aperture in the front plate 86 and a tubular member 96 is welded into an aperture in the rear plate 88. Upper straps 98 and lower strap 100 reinforce the tubular members 94 and 96. Bores 102 and 104 through the tubular members 94 and 96 are spaced apart, in axial alignment and above the upper wall 106 of the rectangular tube 18.

The first wing 14 on the left end of the center section 12 includes an elongated rectangular tube 116 and an outer pivot assembly 108. The outer pivot assembly 108 includes a pair of generally vertical plates 110 and 112 secured to the top surface 114 of an elongated rectangular tube 116. A tubular member 118 with a bore 120 passes through apertures in the vertical plates 110 and 112 above the top surface 114 of the rectangular tube 116 and is welded in place. A plate 122 is welded to the vertical plates 110 and 112, the tubular member 118 and an end plate 124 welded to the inbound end of the elongated rectangular tube 116. Gussets 128 are welded to the vertical plate 110 and the tubular member 118 (not shown) and to the vertical plate 112 and the tubular member 118. A common plane through the gussets 128 intersects a plane including the plate 122 at an angle slightly less than 90°. A slot 130 is formed between the two gussets 128 and is parallel to and between the vertical plates 110 and 112.

The tubular member 118 of the outer pivot assembly 108 is positioned between the tubular members 94 and 96 of the inner pivot assembly 84. A first wing pivot pin 132 passes through the bore 102, the bore 120 and the bore 104 to pivotally connect the first wing 14 to the center section 12. Spring pins 134 retain the first wing pivot pin 132 in the bores 102, 104 and 120. The axis of the first wing pivot pin 132 is the first wing pivot axis 138. The first wing pivot axis 138 is generally horizontal and is spaced from and above the rectangular tube 18 of the center section 12 and the rectangular tube 116 of the first wing 14. A rectangular stop tube 140 is clamped to the end plate 124 by bolts 142 and contacts an end 143 of the rectangular tube 18 to limit pivotal movement of the first wing 16 relative to the center section 12 about the first wing pivot axis 138. Shims 144 are provided to adjust the position of the stop tube 140 so that the stop tube contacts the center section 12 when the elongated rectangular tube 18 and the elongated rectangular tube 116 are in a common horizontal plane.

A lift link 146 is pivotally attached to the outer pivot assembly 108 by a pin 148 that passes through the vertical plates 110 and 112 and is retained by spring pins 150. The pin 148 forms a lift link axis 152 that is spaced from the first wing pivot axis 138 and between the first wing pivot pin 132 and the rectangular tube 116. The lift link axis 152 is parallel to the first wing pivot axis 138. The lift link 146 extends outwardly from the pin 148 and through the slot 130 between the gussets 128.

A double acting hydraulic cylinder 154 functions as a linear actuator and has its head end attached to a cylinder attachment bracket 155, welded to the upper wall 106 of the rectangular tube 18, by a pin 158. The pin 158 is parallel to the first wing pivot pin 132. A pair of spring clip pins 160 retain the pin 158. The rod 162 of the hydraulic cylinder 154 is pivotally attached to the lift link 146 by a pin 156. The pin 156 passes through a yoke 161 on the rod 162 and through a bore 163 through the lift link 146. Bearings 164 and 166 are mounted on the ends of the pin 156 adjacent to the yoke 161. Two spring pins 168 retain the bearings 164 and 166 on the pin 156. The spring pins 168 also retain the pin 156 in the yoke 164 and lift link 146.

Extension of the hydraulic cylinder 154, when the stop tube 140 is in contact with the end 143 of the center section 12 will pivot the lift link 146 about the lift link axis 152 of the pin 148, move the lift link in the slot 130 and move the surface 170 on the lift link away from the tubular member 118. The cylinder 154 is almost fully extended when the stop tube 140 is in contact with an end 143 of the center section 12. The cylinder 154 has sufficient length, however, to allow the first wing 14 to float downward relative to the center section 12 when the stop tube 140 is rotated 90° and the bolts 142 pass through the bores 172. Because the surface 170 on the lift link 146 can pivot away from the tubular member 118, the hydraulic cylinder 154 can not lock the first wing 14 in a working position.

Retraction of the hydraulic cylinder 154 from an extended condition pivots the lift link 146 about the pin 148 until the surface 170 on the lift link contacts the tubular member 118. Further retraction of the hydraulic cylinder 154, after the surface 170 contacts the tubular member 118, pivots the first wing 14 about the first wing pivot axis 138. The bearings 164 and 166 on the pin 156 will enter the two tapered channels 174 and 176 secured to the top of the inner pivot assembly 84. After the first wing 14 has pivoted over 90°, the center of gravity of the first wing 146 will cross a vertical plane parallel to and through the first wing pivot axis 138 and the weight of the first wing 14 will start trying to shorten the hydraulic cylinder 154. At this point the bearings 164 and 166 are restrained in the tapered channels 174 and 176 and the hydraulic cylinder 154 continues to control pivotal movement of the first wing 14 about the first wing pivot axis 138. Further retraction of the hydraulic cylinder 154 will allow continued pivotal movement of the first wing 14 about the first wing pivot axis 138, pivot the lift link 146 away from the tubular member 118 and further into the slot 130 in the outer pivot assembly 108, and lower the top surface 114 of the rectangular tube 116 into contact with a rubber cushion 178 attached to a stop support 180 that is welded to the cylinder attachment bracket 155 on the rectangular tube 18. Shims 181 are provided to adjust the position of the rubber cushion 178.

Figure 2:
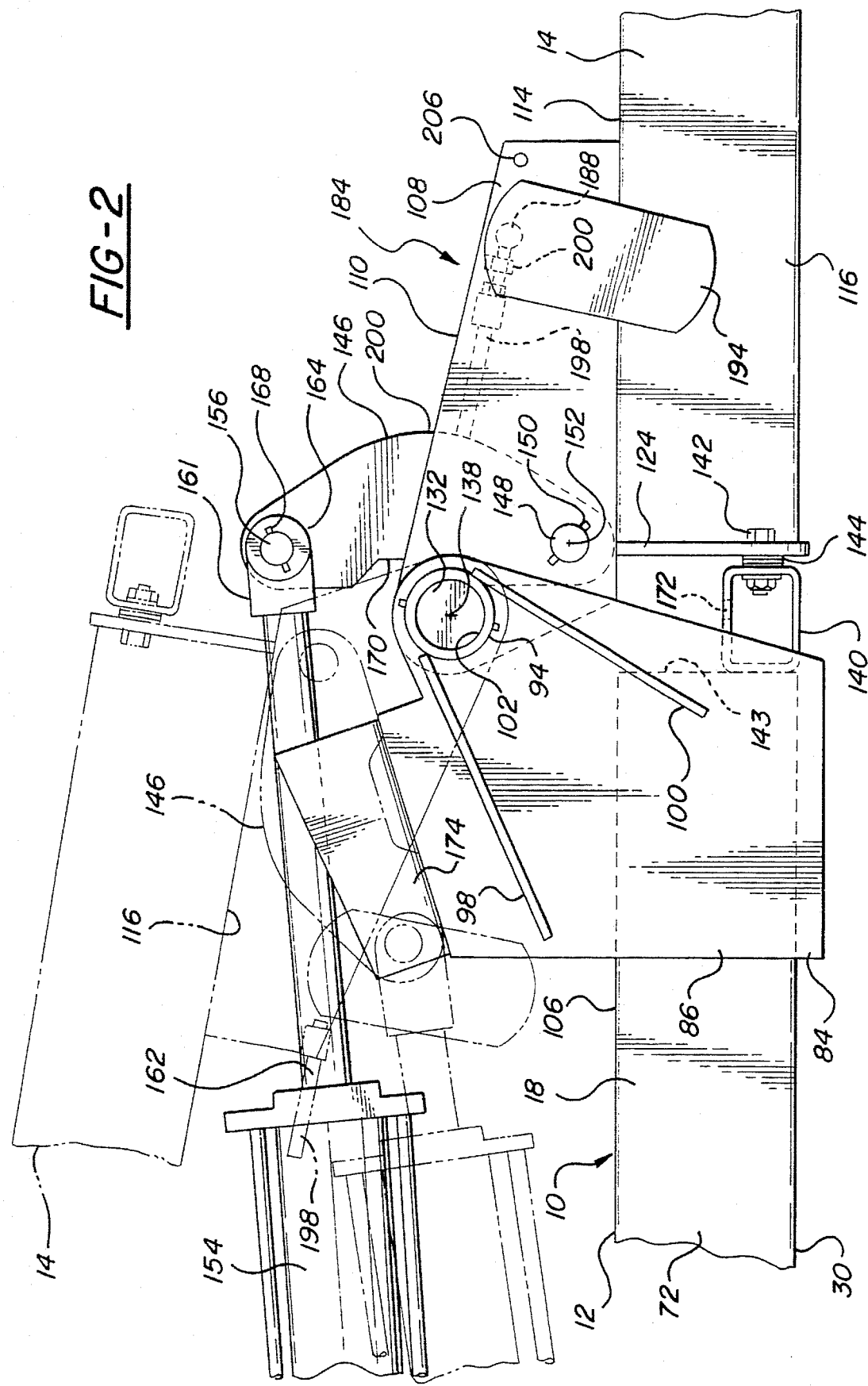
FIG. 2 is an enlarged front elevational view of one of the toolbar folding wing pivots with parts broken away and with the folding wing shown in a transport position in phantom lines.
Figure 3:
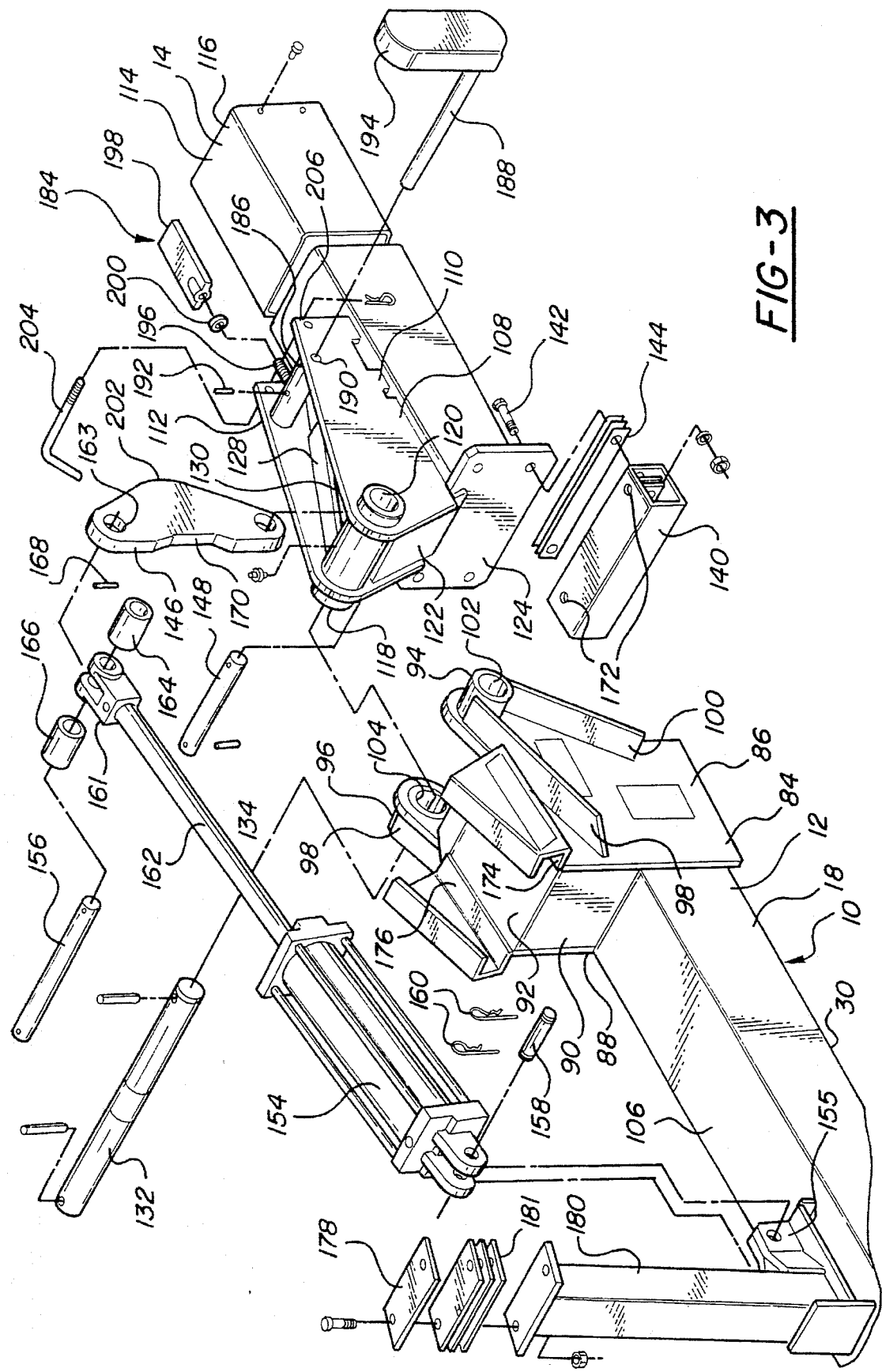
FIG. 3 is an enlarged expanded perspective view of one of the toolbar folding wing pivots and the folding wing lock.
Figure 4:
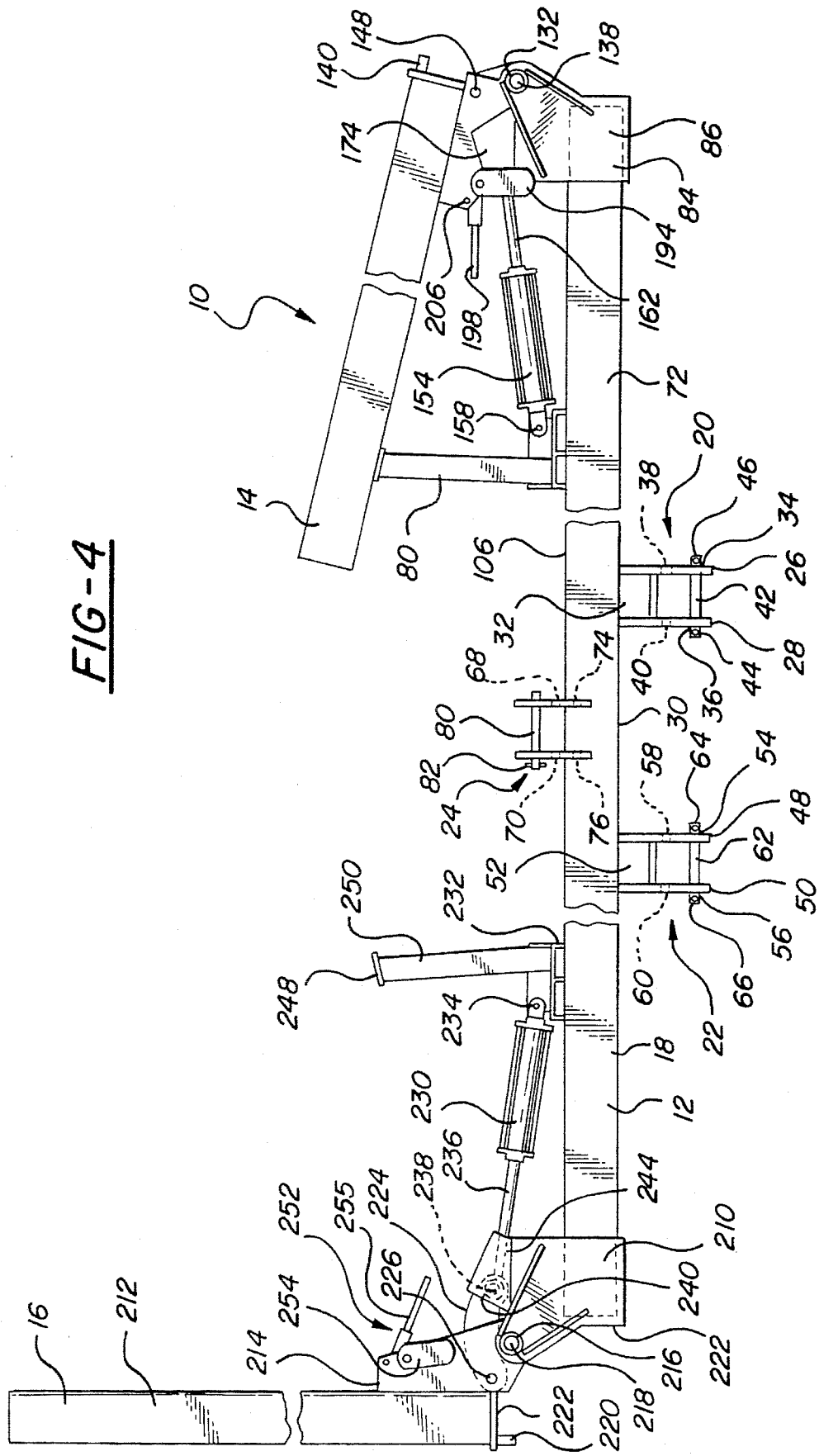
FIG. 4 is an enlarged front elevational view of the toolbar with one wing folded and the other wing partly folded.

As shown in the drawing, the stop support 180 is relatively long and limits pivotal movement of the first wing 14 about the first wing pivot axis 138. If desired the stop support 180 could be shortened and the range of pivotal movement of the first wing 14 about the first wing pivot axis 138 could exceed 180°. To obtain 180° of movement of the first wing 14 about the pivot axis 138, it would also be necessary to permit additional movement of the lift link 146, as shown in FIG. 2.

Extension of the hydraulic cylinder 154 will raise the first wing 14 off the rubber cushion 178 and move it toward a working position. Continued extension of the hydraulic cylinder 154 will pivot the first wing 14 about the first wing pivot axis 138 and move the center of gravity of the first wing 14 and any attached attachments through a vertical plane parallel to and through the first wing pivot axis. The surface 170 on the lift link 146 will move into contact with the tubular member 118 upon further extension of the cylinder rod 162 and the first wing will exert a force on the hydraulic cylinder 154 that tends to extend the hydraulic cylinder. Further extension of the hydraulic cylinder 154 will allow the first wing 14 to pivot about the first wing pivot axis 138 until the rectangular stop tube 140 contacts the end 143 of the center section 12 and prevents further pivotal movement. The first wing 14 is free to pivot upward about the first wing pivot axis 138 after the first wing reaches a working position in response to a vertical force on soil engaging tools attached to the first wing. Locking the hydraulic cylinder 154 will not prevent floating because the pin 156 is free to pivot in an arc about the pin 158 and the lift link 146 is free to pivot about the pin 156 and the pin 148.

There are conditions in which the first wing 14 should be locked in a fixed working position and not allowed to pivot about the first wing pivot axis 138. These conditions occur when it is necessary to maintain fixed row spacing and when it is necessary to transfer weight from the toolbar 10 to soil working gangs or units attached to the toolbar in order to obtain proper soil penetration as well as under some other circumstances. At the same time it is desirable to be able to fold the first wing at each end of the field so that the tractor and implement can be turned 180° and make another pass through the field. It is also desirable to be able to fold the first wing 14 or the second wing 16 to clear obstructions in a field such as rocks, buildings, trees, fences and irrigation equipment.

A lift link lock assembly 184 includes a pivot tube 186 pivotally supported between the vertical plates 110 and 112 of the outer pivot assembly 108 by a pendulum shaft 188 that passes through apertures 190 through the outer pivot assembly. The pivot tube 186 is fixed to the pendulum shaft 188 by a spring pin 192. The pendulum shaft 188 provides a pivot axis that is parallel to and spaced form the first wing pivot axis 138. A pendulum weight 194 is rigidly secured to the pendulum shaft 188 and rotates the pivot tube 186 relative to the outer pivot assembly 108 when the first wing 14 pivots relative to the center section 12 and the lift link lock assembly 184 is operable. A radially extending threaded stud 196 is rigidly secured to the pivot tube 186. A lift link lock latch bar 198 screws onto the threaded stud 196 and is locked in a selected position by a lock nut 200.

The lift link lock latch bar 198 is preferably adjusted on the threaded stud 196 to a position in which the lift link lock latch bar 198 contacts the arcuate surface 202 on the lift link 146 when the stop tube 140 is in contact with the end 143 of the center section 12 and slightly before the hydraulic cylinder 154 is fully extended. With this adjustment of the lift link latch bar 198, the lift link lock latch bar will be moderately loaded and locked in place by friction when the hydraulic cylinder is fully extended. By moderately loading the lift link lock latch bar 198, the pivot pins 132, 148, 156 and 158 are all moderately loaded and substantially all movement about the axes of these pins is prevented. The prevention of movement about the pins 132, 148, 156 and 158 eliminates most or all of the wear that would occur during cultivating or planting operations. A slight retraction of the hydraulic cylinder 154 will pivot the lift link 146 about the pin 148 toward the first wing pivot pin 132 and free the lift link lock latch bar 198 and the pendulum weight to again pivot in response to gravity. Changing the position of the stop tube 140 by changing the shims 144 or by rotating the stop tube as explained above will require readjustment of the latch bar 198 relative to the threaded stud 196.

Retracting the cylinder 154 from the extended position will pivot the lift link 146 about the pin 148 until the surface 170 on the lift link 146 in contact with the tubular member 118 and then pivot the first wing 14 upwardly about the first wing pivot axis 138. As the first wing 14 pivots upward, the pendulum weight 194 will pivot the latch bar 198 away from the arcuate surface 202 on the lift link 146 thereby freeing the lift link to pivot relative to the pin 148 and the outer pivot assembly 108. Freeing the lift link 146 to pivot relative to the outer pivot assembly 108 allows the first wing to pivot about the first wing pivot axis 138 until the top surface 114 contacts the rubber cushion 178 on the stop support 180. During pivotal movement of the first wing 14 back to a working position, the pendulum weight 194 will pivot the latch bar 198 back to a position in which the lift ling 146 is fixed relative to the outer pivot assembly 108. Hydraulically locking the hydraulic cylinder 154 then locks the first wing 14 in a fixed position.

To let the first wing 14 float relative to the center section 12, the pivot tube 186 is rotated to a storage position and a rod 204 is inserted into aligned passages 206 through the vertical plates 110 and 112, to hold the lift link lock latch bar 198 in an inoperative position.

The second wing 16 of the tool bar 10 is substantially the same as the first wing 14 and functions in exactly the same way. A second wing attaching inner pivot assembly 210 is rigidly secured to the right end of the rectangular tube 18. The second wing 16 includes an elongated rectangular tube 212 and an outer pivot assembly 214. A tubular member of the outer pivot assembly 214 is positioned within the inner pivot assembly 210. A second wing pivot pin 216 passes through the tubular member of the outer pivot assembly 214 and the inner pivot assembly 210 to pivotally connect the second wing 16 to the center section 12. The axis of the second wing pivot pin 216 is the second wing pivot axis 218. The second wing pivot axis 218 is generally horizontal and is spaced from and above the rectangular tube 18 of the center section 12 and the rectangular tube 212 of the second wing 16. A rectangular stop tube 220 is clamped to an end plate 222 and contacts an end of the rectangular tube 18 to limit pivotal movement of the second wing 18 in one direction about the second wing pivot axis 218. The position of the stop tube 220 is in the same way the stop tube 140 is adjustable in the same way the stop tube 140 is adjustable.

A lift link 224 is pivotally attached to the outer pivot assembly 214 by a pin 226 that forms a lift link axis 228. A double acting hydraulic cylinder 230 has its head end attached to a cylinder attachment bracket 232 welded to the upper wall 106 of the rectangular tube 18 by a pin 234. The rod 236 of the hydraulic cylinder 230 is pivotally attached to the lift link 224 by a pin 238. Bearings 240 are mounted on the ends of the pin 238. The bearings 240 and 242 are restrained in tapered channels 244 and 246 when the second wing 16 exerts a compression load on the hydraulic cylinder 230.

A rubber cushion 248 attached to the stop support 250 supports the second wing 16 when the wing is in a folded transport position. The stop supports 180 and 250, as shown, limit folding of the first wing 14 and the second wing 16 in positions that insure that soil engaging units or gangs on the outer ends of the wings do not contact each other.

A lift link lock assembly 252 is mounted on the outer pivot assembly 214. A pendulum weight 254, that is identical to the pendulum weight 194, controls the lift link lock assembly 252. A lift link lock latch bar 255 performs the same function as the lift link lock latch bar 198 and is adjustable in the same way. The operation of the second wing 16 and the lift link lock assembly 252 is the same as operation of the first wing 14 and the lift link lock assembly 184.

The tool bar 10 could, if desired, have two wings on each side of the center section for a total of five sections. The lift link lock assemblies could, if desired, be used to lock each of the wings or to let them float.

FIG. 1 shows a toolbar 10 with a row crop cultivator gang 260 attached to the rectangular tubes 18, 116 and 212. There would be a plurality of gangs attached along the entire length of the tool bar 10. The gangs would be mounted on a predetermined uniform spacing. Thirty inches is a common spacing for corn. However, there are other spacings that are employed. The row crop cultivator gang 260 is only one example of a soil engaging tool that is commonly attached to a toolbar.

The toolbar 10, as disclosed, employs rectangular tubes 18, 116 and 212. The cross sectional shape of the toolbar 10 could be changed if desired. The attaching system for clamping soil engaging units or gangs to the tool bar 10 can be modified to accommodate a variety of toolbar shapes and sizes. It would also be possible, if desired, to use solid members rather than hollow beams to construct the tool bar 10.

The preferred embodiment of the invention has been described in detail but is an example only and the invention is not restricted thereto. It will be easily understood by those skilled in the art that modifications and variations can easily be made within the scope of this invention.

We claim:

1. A toolbar for supporting soil working tools comprising an elongated center section frame and at least one draft link attaching assembly attached to the center section frame;

an elongated first wing frame with an inboard end pivotally attached to an outboard end of the center section frame by a first wing pivot pin for pivotal movement about a generally horizontal first wing pivot axis that is generally transverse to a long axis of the center section frame;

a first lift link with an outboard end pivotally attached to the first wing frame at a position spaced from the generally horizontal first wing pivot axis, a first linear actuator connected to the center section frame and to an inboard end of the first lift link, and a first lift link contact surface secured to the first wing frame that contacts the first lift link to limit pivotal movement of the first lift link relative to the first wing frame in one direction; and a first lift link lock assembly with a first lift link lock latch bar pivotally attached to the first wing frame and a first weight attached to the first lift link lock latch bar that pivots the first lift link lock latch bar into a position to substantially prevent pivotal movement in at least one direction between the first wing frame and the first lift link when the first wing frame is in a working position and which pivots the first lift link lock latch bar relative to the first wing frame to a position in which the first lift link is free to pivot relative to the first wing frame in response to pivotal movement of the first wing frame about the first wing pivot axis toward a first wing frame folded transport position.

2. A toolbar as set forth in claim 1 including a first latch bar retainer attached to the first wing frame and contacting the first lift link lock assembly for holding the first lift link lock latch bar in an inoperative position to allow the first wing frame to pivot about the first wing pivot axis when the first linear actuator is held in an extended position.

3. A toolbar as set forth in claim 1 including an elongated second wing frame with an inboard end pivotally attached to another outboard end of the center section frame by a second wing pivot pin for pivotal movement about a generally horizontal second wing pivot axis that is generally transverse to the long axis of the center section frame;

a second lift link with an outboard end pivotally attached to the second wing frame at a position spaced from the generally horizontal second wing pivot axis, a second linear actuator connected to the center section frame and to an inboard end of the second lift link, and a second lift link contact surface secured to the second wing frame that contacts the second lift link to limit pivotal movement of the second lift link relative to the second wing frame in one direction; and a second lift link lock assembly with a second lift link lock latch bar pivotally attached to the second wing frame and a second weight attached to the second lift link lock latch bar that pivots the second lift link lock latch bar into a position to substantially prevent pivotal movement in at least one direction between the second wing frame and the second lift link when the second wing frame is in a working position and which pivots the second lift link lock latch bar relative to the second wing frame to a position in which the second lift link is free to pivot relative to the second frame in response to pivotal movement of the second wing frame about the second wing pivot axis toward a second wing frame folded transport position.

* * * * *